July 20, 1954 R. BAADER 2,683,893
MACHINE FOR DRESSING FISH SUCH AS HERRING
Filed Oct. 26, 1950 8 Sheets-Sheet 3

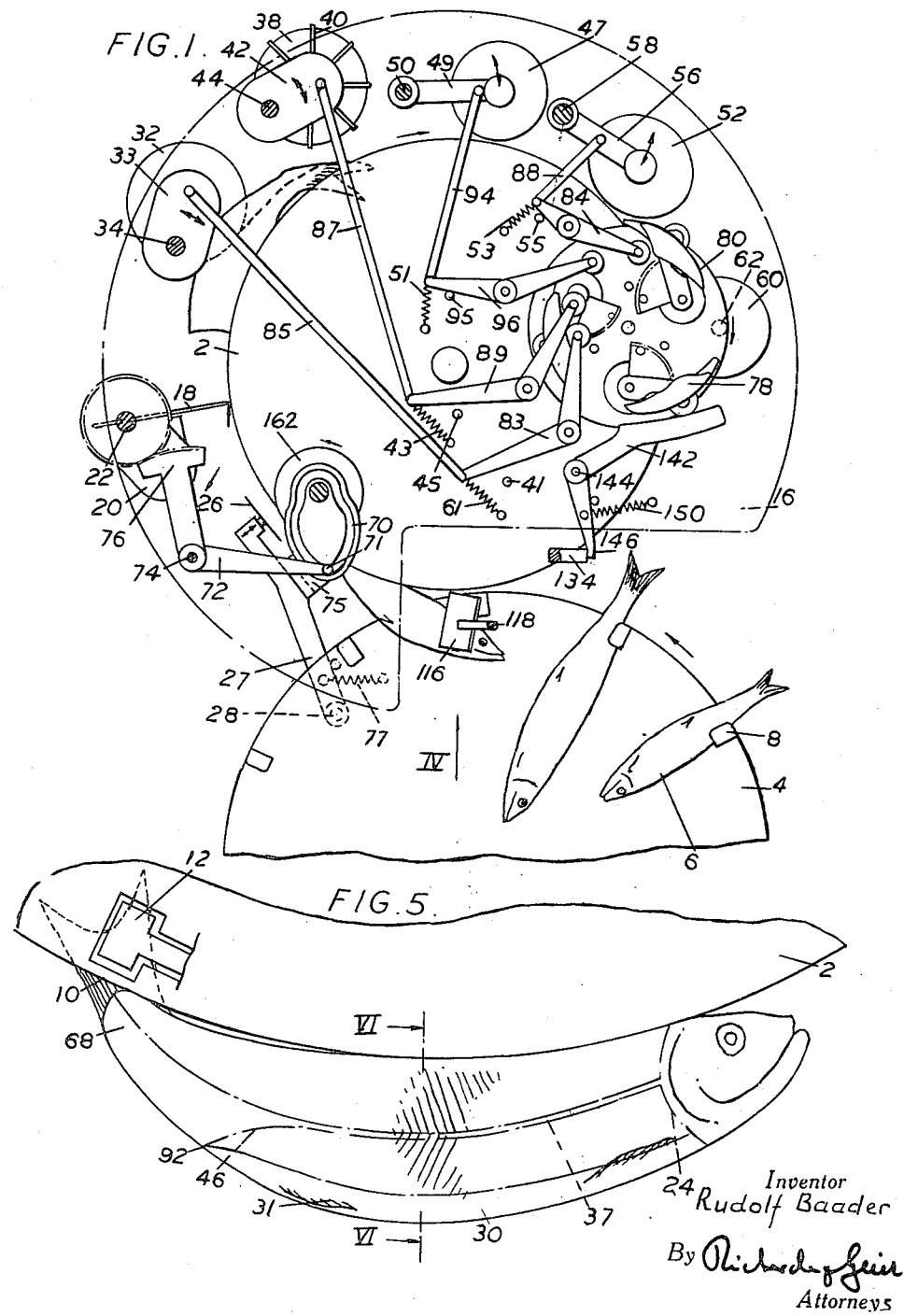

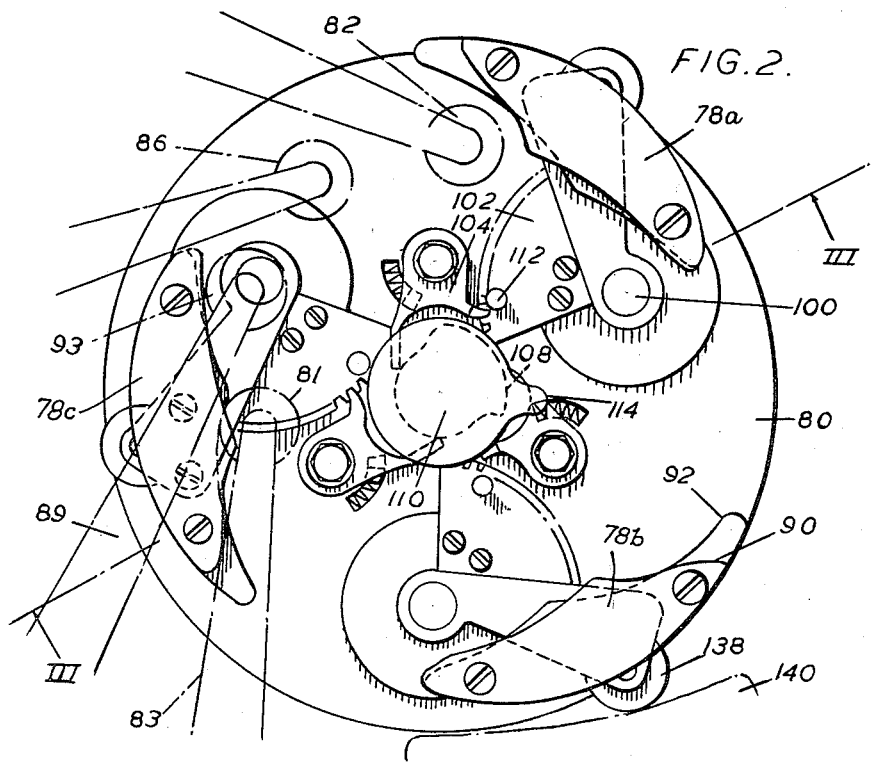
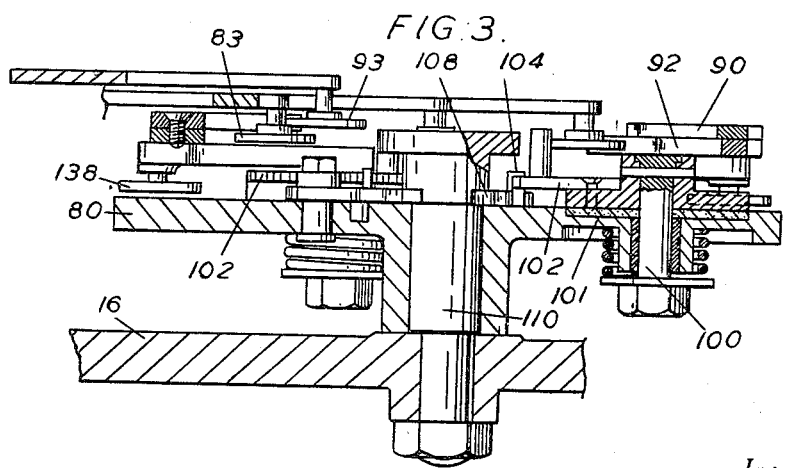

Inventor
Rudolf Baader
By Richard.....
Attorneys

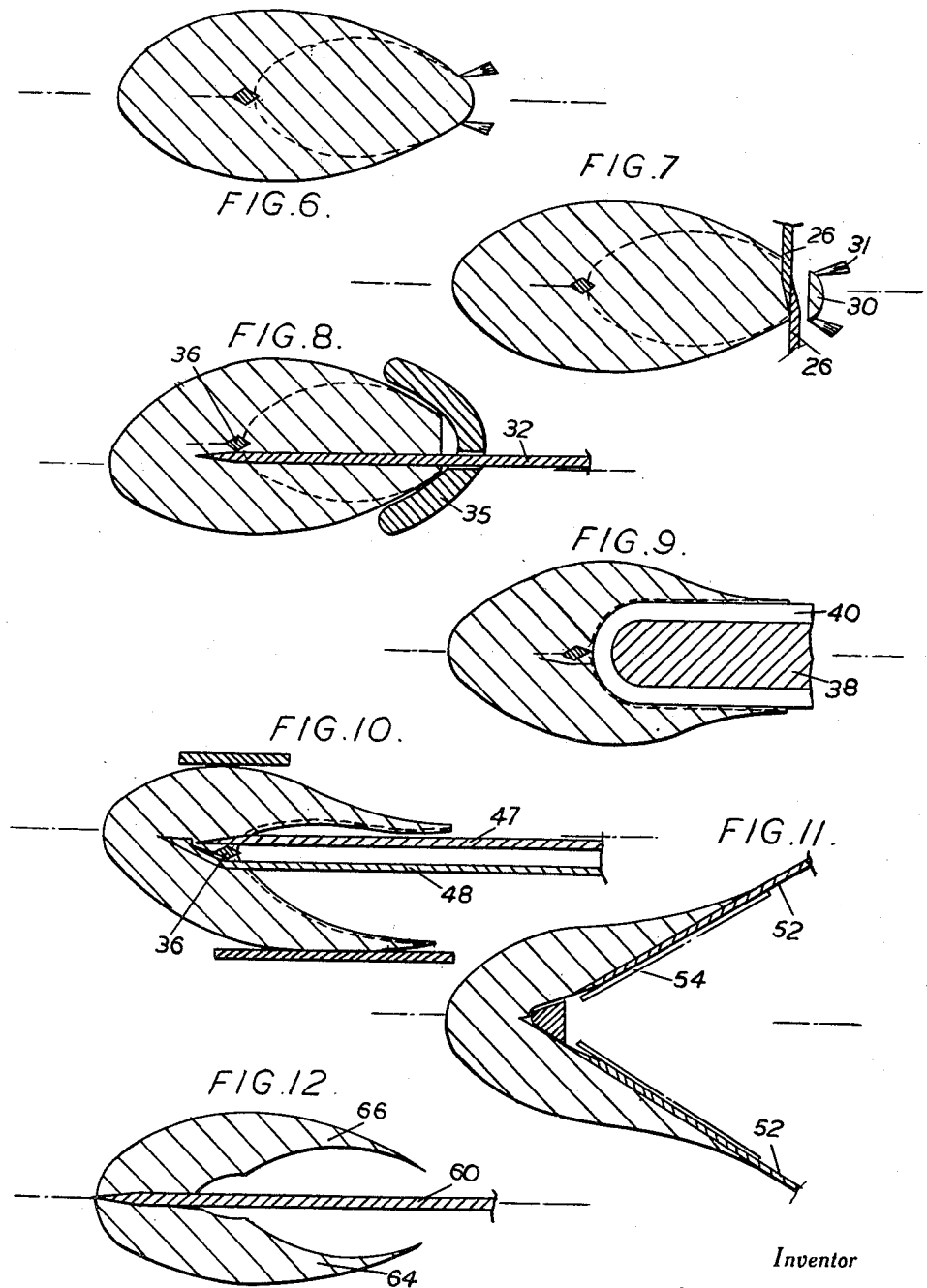

July 20, 1954  R. BAADER  2,683,893
MACHINE FOR DRESSING FISH SUCH AS HERRING
Filed Oct. 26, 1950  8 Sheets-Sheet 5
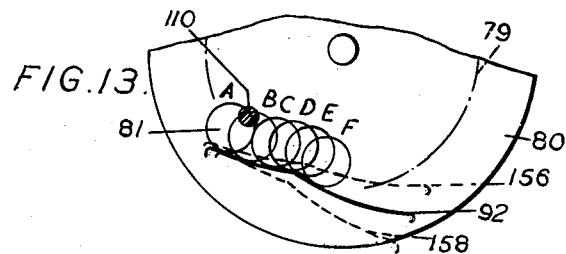
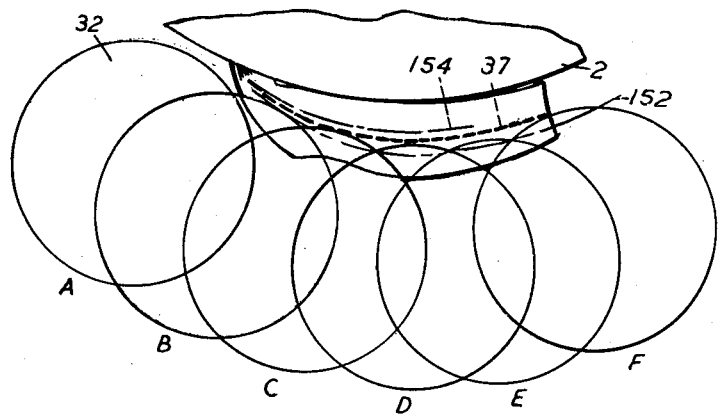
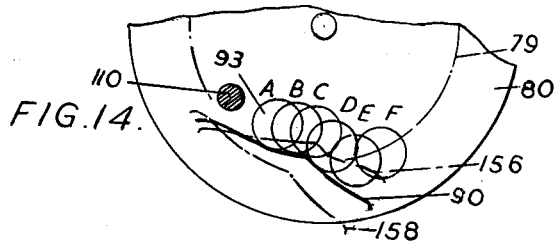
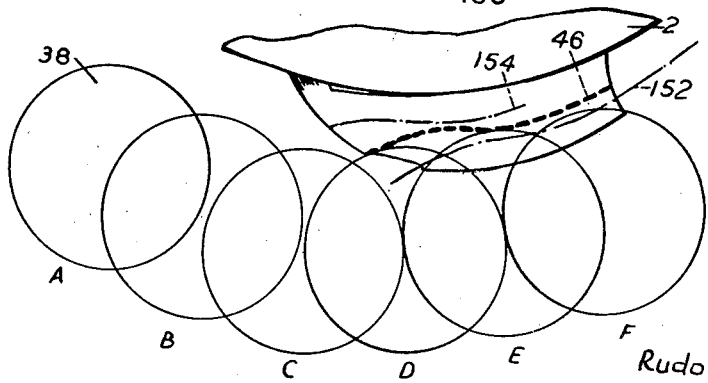
Inventor
Rudolf Baader
By Richards & Geier
Attorneys Inventor
Rudolf Baader July 20, 1954 R. BAADER 2,683,893
MACHINE FOR DRESSING FISH SUCH AS HERRING
Filed Oct. 26, 1950 8 Sheets-Sheet 7
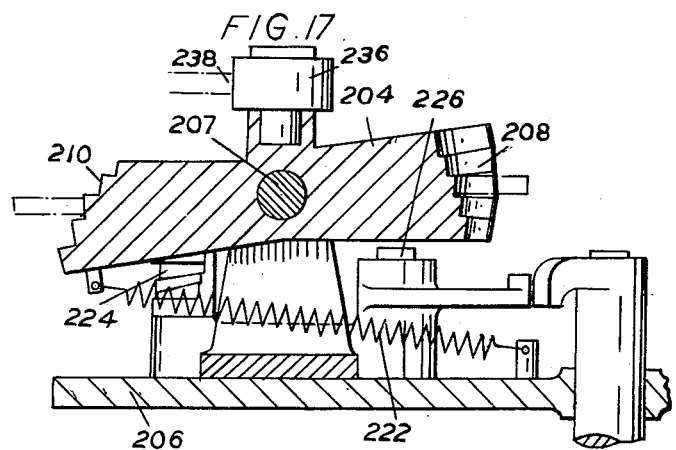
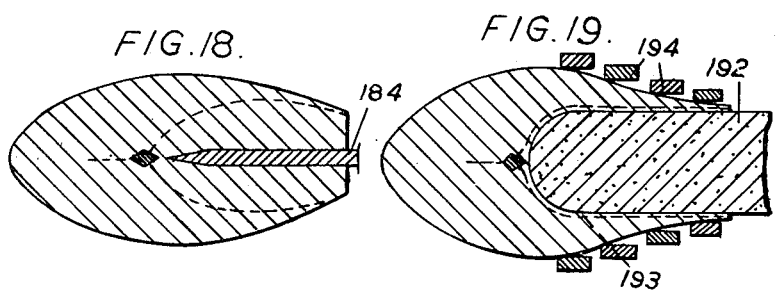
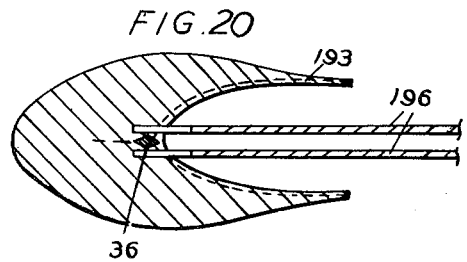
Inventor
Rudolf Baader
By
Attorneys

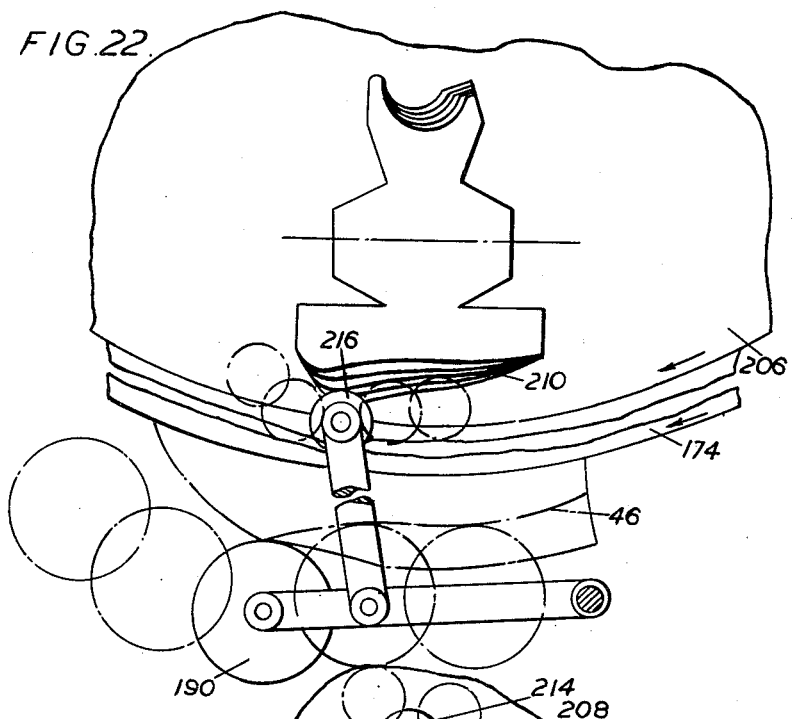
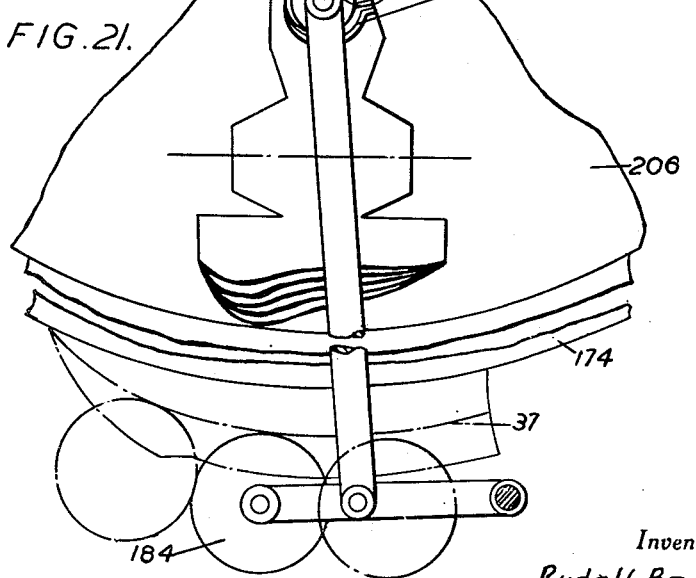

Patented July 20, 1954

2,683,893

UNITED STATES PATENT OFFICE 2,683,893

MACHINE FOR DRESSING FISH SUCH AS HERRING

Rudolf Baader, Lubeck, Germany

Application October 26, 1950, Serial No. 192,305

8 Claims. (Cl. 17—3)

This invention relates to machines for dressing fish such as herrings.

In the mechanical dressing of fish the extent to which the fish in a single catch may differ in size makes it desirable to control the operation of the various dressing tools in accordance with the size of the fish. This can be done by means of a measuring shoe which is displaced by the passage of a fish towards the dressing tools. The exact movement of the shoe depends on the dimensions of each particular fish and this movement is used to control the operation of a dressing tool. This is satisfactory so long as only one dressing step, e. g. the removal of the backbone or the cleaning of the belly cavity is being controlled, but when a series of tools is provided to perform different operations the control of all or most of them in accordance with the size of the fish so complicates the construction that it has hitherto been regarded as impracticable.

A further fact which complicates the construction of the machine is that not all the tools should carry out movements of the same kind. For instance it is the common practice to clean out the belly cavity by means of a tool which should be kept clear of the tail end of the fish, enter the belly cavity at the vent and progressively penetrate to the backbone. This tool must therefore be controlled in accordance with the line followed by the tail end of the fish and the base of the opened belly cavity, which will be called the line of the underside of the fish, and the control may be effected by means of a cam which has a sharp bend or knee at the point corresponding to the vent. On the other hand a knife used to make a cut by which the removal of the backbone is facilitated most move in a path corresponding to the line of the backbone, and so should be controlled by a cam shaped to correspond to this line.

Another factor which must be taken into account if the fish are to be dressed in the best possible way is that in fish of different sizes the lines of the underside and the backbone respectively are not identical in shape, so that a cam surface designed to produce the correct tool movement for a fish of one size will not do the same for a fish of another size even if it is adjusted in position by means of a measuring shoe to bring the tool into operation at the proper moment having regard to the length of the fish.

An object of this invention is to provide an improved machine by which fish of different sizes may be more accurately dressed than hitherto.

Another object of the invention is to provide a plurality of cam surfaces corresponding to different parts of the fish and to control the operative positions of these cam surfaces through a single device responsive to a dimension of the fish.

A further object of the invention is to provide an improved cam construction in a fish-dressing machine.

Yet another object of the invention is to provide cam members having operative cam surfaces differing in shape from one another and corresponding to the same line, e. g. the line of the backbone, in fish of different sizes.

Other objects will appear from the following description of two machines constructed according to the invention, when read in connection with the annexed drawings, and in the course of the description the improvement forming the invention will be made clear.

In the drawings:

Figure 1 is a diagrammatic plan showing the layout of one machine;

Figure 2 is a plan, on a larger scale of a wheel carrying the control cams;

Figure 3 is a section on the line III—III in Figure 2;

Figure 5 is a plan of a fish as it is carried round the machine.

Figure 6 is a cross-section on the line VI—VI in Figure 5;

Figures 7 to 12 are cross-sections at the same part showing the operations performed by various tools;

Figures 13 and 14 are diagrams showing the displacements given to two different tools;

Figure 17 is a section on the line XVII—XVII in Figure 16;

Figures 18 to 20 are further cross-sections of fish; and

Figures 21 and 22 are further diagrams showing the displacements given to the different tools.

Figure 4:
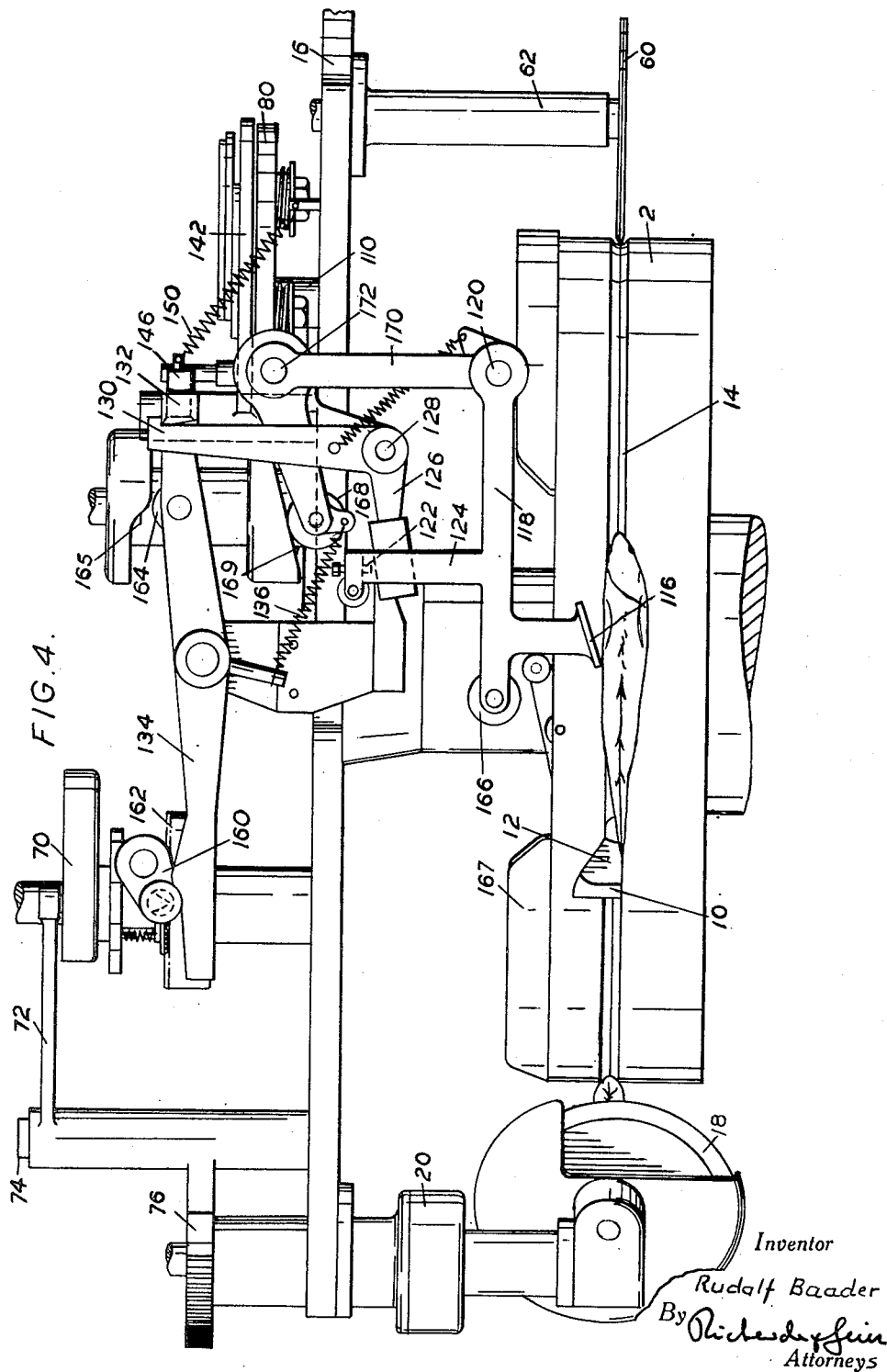
Figure 4 is an elevation on the same scale as Figures 2 and 3 of mechanism by which the length of the fish is measured. This view is in the direction of the arrow IV in Figure 1, but much of the mechanism is for clarity omitted from Figure 1.

In the centre of the machine shown in Figures 1 to 4 there is a drum 2 which rotates continuously clockwise as seen in Figure 1. To the side of this drum there is a table 4 which rotates anticlockwise at a slower speed. Fish are laid by hand on the table 4 as indicated at 6 so that they are on their sides with their backs engaged by clips 8 and with their tails hanging over the edge of the table. Around the periphery of the drum 2 there are three openings 10 within which are clamps 12 operated by a stationary cam (not shown) as the drum rotates. In turn the tail of each fish enters an opening 10 and is gripped by a clamp 12. Then, as the drum rotates, the fish is drawn off the table and travels round with the drum in the position shown in Figure 5 with its back located in a groove 14 in the periphery of the drum.

The fish is carried past a succession of tools which are arranged round the drum. Between the tools the fish is supported and directed by various guides which are for clarity omitted from Figure 1 since they form no part of the invention. These tools and guides are supported by a plate 16 which for clarity is indicated only in outline in Figure 1.

The first tool comprises a pair of rotating disc knives 26. These are mounted in a housing 27 which can swing about a fixed axis 28 and as shown in Figure 7 they cut off a thin strip 30 from the bottom of the belly by a shearing action and so remove the fins 31. The drive to the knives and to all other continuously rotating parts is omitted since it forms no part of the invention and would entirely obscure the remainder of the construction. The second tool is a heading knife 18. This is a continuously rotating disc knife mounted in a housing 20 which can oscillate about a fixed axis 22 so that the knife makes a transverse cut and severs the head along the line 24 in Figure 5.

The third tool is a rotating disc knife 32 mounted in a housing 33 which can oscillate about a fixed axis 34. As the fish passes it is canted by a guide 35 so that the knife makes a cut below the backbone 36 as shown in Figure 8. This tool enters the fish as far as the line 37, shown in Figure 5, which is parallel to the backbone and just beyond it.

The fourth tool, shown in Figure 9, is a rotating disc 38 with radial ribs 40, mounted in a housing 42 which can swing about a fixed axis 44. This tool enters the belly cavity as far as the line 46, shown in Figure 5, and removes the roes and guts.

The fifth tool is a rotating disc knife 47 which makes a cut above the backbone 36 intersecting the cut made by the knife 32. As shown in Figure 10, this knife cooperates with a plate 48 so that the backbone is gripped between them and drawn out of the fish.

Both the knife 47 and the plate 48 are mounted in a housing 49 which can swing about a fixed axis 50 so that the knife cuts into the fish as far as the line 37.

The sixth tool comprises a pair of knives 52 which, as shown in Figure 11, cut away from the insides of the belly walls thin slices 54 containing the ribs. They are mounted in a housing 56 which can swing about a fixed axis 58.

The final tool is a disc knife 60 rotating on a fixed axis 62. This divides the fish into two fillets 64 and 66 as shown in Figure 12. The tail then is released from the clamp 12 and at the same time is gripped at the root of the tail 68 by a moving clamp, not shown, and carried clear of the machine. The tail is cut off and the two fillets fall apart.

The function of the knife 60 is to make the cut right through each fish. This knife must lie at a constant distance from the drum 2 and it is for this reason that it turns about a fixed axis. All the other tools, however, must follow paths dependent on the shape of the fish if they are to function properly, and for this reason they are mounted in movable housings, which are cam-controlled.

The heading knife 18 is controlled by a channel cam 70 which is peculiar to this knife. This cam, which is engaged by a follower 71 on a rocking arm 72, rotates intermittently and so causes the arm 72 to rock about a fixed pin 74. The arm 72 carries a gear sector 76 which engages the housing 20 and causes it to move the knife 18 towards and away from the drum 2. The contour of the cam 70 is such that when the cam rotates the combined movement of the fish and of the leading edge of the knife 18 produces the cut 24 which curves close behind the gill openings.

The housing 27 is urged by a spring 77 towards the drum 2 and carries a shoe 75 of V cross-section which engages the fish so that a strip 30 of constant depth is cut off the belly.

The remaining tools are under the control of a cam wheel 80, which carries three cam members 78a, 78b and 78c, one corresponding to each tail clamp 12. Now the tool 38 ought not to touch the tail end of the fish at all but rather should simply enter the belly cavity as defined by line 46. It should therefore be controlled in its movement in accordance with the line of the underside of the fish when the belly has been cut open. On the other hand the knife 32, the knife 47 and plate 48, and the knives 52 must penetrate past the backbone for the whole length of the fish, and therefore should be controlled in their movements in accordance with the line 37 parallel to the backbone. These different requirements are met according to the invention by providing two different cam surfaces on each cam member 78a, 78b and 78c, namely a surface 90 which corresponds to the line 46 and a surface 92 which corresponds to the line 37.

The drum 2 and wheel 80 turn at the same speed. As a fish approaches the knife 32, the cam surface 92 of the cam member 78a corresponding to this fish engages a follower in the form of a roller 81 carried by a bell crank 83 which is linked to the housing 33 by a link 85. The cam rocks the bell crank so that the housing 33 is rocked away from the drum 2 against the action of a spring 81 and the knife 32 thus cuts into the fish only to the line 37. When the fish has passed, the knife is allowed to swing back close to the drum to a position determined by a stop 41. The extreme position of the axis of the follower 81 is indicated by the arc 79.

The action of the knife 32 is diagrammatically shown in Figure 13, which is drawn as if the drum 2 and the wheel 80 were stationary with the fixed pivots moving round them. In this diagram the letters A to F indicate successive positions of the knife 32 and the follower 81 at uniform intervals of time.

The tool 38 must penetrate to the base of the belly cavity over its whole length. The housing 42 of this tool is connected by a link 87 to a bell crank 89 which carries a cam follower 93. As a fish approaches the tool 38, the housing 42, is rocked by the cam surface 90 of the cam member 78a against the action of a spring 43, so that the tool is clear of the tail of the fish. The surface 90 has a knee 91 and when the follower 93 passes this knee the tool moves towards the fish and enters the belly cavity along the line 46. When the follower 93 runs off the cam surface 90, the inward movement of the housing is limited by a stop 45. The action of the tool 38 is diagrammatically shown in Figure 14.

As the drum 2 and wheel 80 turn further, the cam surface 92 of the cam member 78a engages a follower 86 carried by a bell crank 96 which is connected by a link 94 to the housing 49. Thus the knife 47 and plate 48 are given a movement similar to that given to the knife 32. The bell crank 96 is controlled by a spring 51 and a stop 95.

Thereafter the cam surface 92 engages a follower 82 carried by a lever 84 which is connected by a link 88 to the housing 56 of the knives 52 and rocks these away from the fish in just the same way as the knife 32 was rocked away. This lever 84 is controlled by a spring 53 and a stop 55.

In order to allow for the considerable variation in size from herring to herring, the cam members 78a, 78b and 78c are made movable on the wheel 80, and are reset in position for the passage of each fish. Each member is pivoted to the wheel at 100 and can turn stiffly on a friction disc 101. Each member includes a toothed sector 102 which is normally engaged by a spring-loaded detent 104, so that the member is locked in a selected position. When as the wheel 80 rotates a member reaches a position clear of the followers, the detent engages a projection 108 on a central fixed pin 110, and is disengaged from the sector 102. As soon as it is free, the cam member is pushed to an extreme outward position (corresponding to the smallest possible fish) by the engagement of a stud 112 on the member with a further projection 114 at a higher level on the fixed pin 110. The cam member is then ready for setting.

Each cam member carries a roller 138 which engages a curved surface 140 on the end of a bell-crank lever 142. This lever has a fixed pivot 144 and is held stationary by the engagement of its end 146 with the end of a rocking lever 134. As the wheel 80 turns, the cam member 78 is gradually pushed inwards to positions corresponding to larger fish until the rocking lever 134 is moved, the movement of this lever taking place earlier or later in accordance with the size of the fish. As soon as the rocking lever 134 moves clear of the end 146 the lever 142 yields against a light spring 150, so that the cam member remains in the position so far reached. Soon afterwards, the detent 104 re-engages the sector 102 and the cam member is ready to engage the followers 81, 93, 86 and 82 at the appropriate moments and displace them to the appropriate extent. In Figures 13 and 14 the dotted outlines 152 and 154 indicate the extent to which tools penetrate into extremely large and small fish and the dotted outlines 156 and 158 the corresponding positions of a cam member.

The rocking lever 134 is moved through a measuring mechanism shown in Figure 4. This includes a shoe 116, and as each fish in turn is drawn off the table 4 it passes beneath the shoe 116, which is lifted by and rides over the fish. As the eyes of the fish pass from under the shoe, it drops sharply onto the snout and so a lever 118 carrying the shoe tilts sharply about a pivot 120. This movement is sufficient to allow a pin 122 on an upstanding arm 124 on the lever 118 to engage and tilt a bell crank lever 126 which is on a fixed pivot 128. This shifts a catch 130 out of engagement with a lug 132 on the rocking lever 134, which turns anticlockwise (as seen in Figure 2) under the influence of a spring 136.

The movement of the lever 134 not only releases the bell-crank lever 142 but also engages a clutch 160 so that the channel cam 70 begins to be turned by a continuously rotating gear 162. By the time the next fish reaches the shoe 116, the mechanism is reset into the position shown in Figure 2 by engagement of rollers 164 and 166 with continuously rotating cams 165 and 167. The channel cam 70 is thus brought to rest after one revolution, and the bell crank lever 142 is caught into the position to which it has been returned by the spring 150.

Although the shoe 116 responds to the position of the eyes of the fish, the channel cam 70 should start rotation at a time dependent upon the length of the fish from the tail to the back of the head. Accordingly as each fish passes under the shoe, the pivot 120 is shifted gradually to the right in Figure 2 by the engagement of a continuously rotating cam 169 with a roller 168 on a bell crank lever 170 having a fixed pivot 172. This allows for the length of the head. Since the correction is the same for all fish of the same size, the action of the surface 140 in setting the cam members 78 is not adversely affected.

It will be seen that by reason of its construction this machine is able to dress herrings of a wide range of sizes and in so doing to make a number of different cuts in various parts of the fish of the exact shape and extent required for each fish. This is made possible by the provision of the different cam surfaces to control those tools which follow different lines through the fish, and by making these cams themselves adjustable in accordance with a measurement of each fish. It will be appreciated that there need not be the same number of cam members 78 on the wheel 80 as there are clamps 12, provided that as each fish is drawn off the table 4 a cam member is presented for setting and that the cam followers are so disposed that a cam member set in accordance with the size of a particular fish engages the followers at the times when the corresponding tools are operating on that fish.

Figure 15:
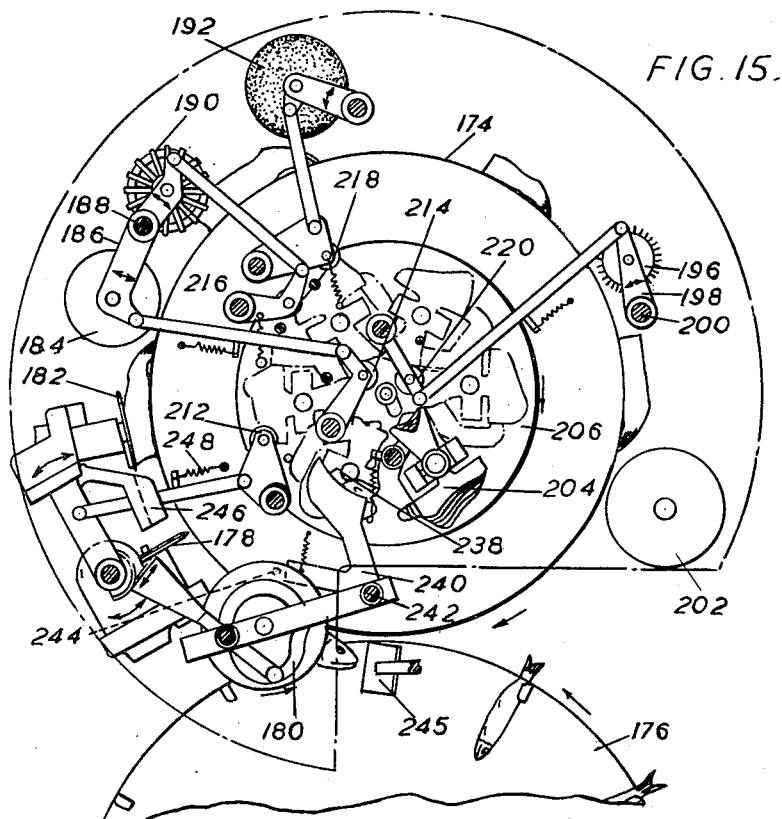
Figure 15 is a diagrammatic plan showing the layout of the other machine.
Figure 16:
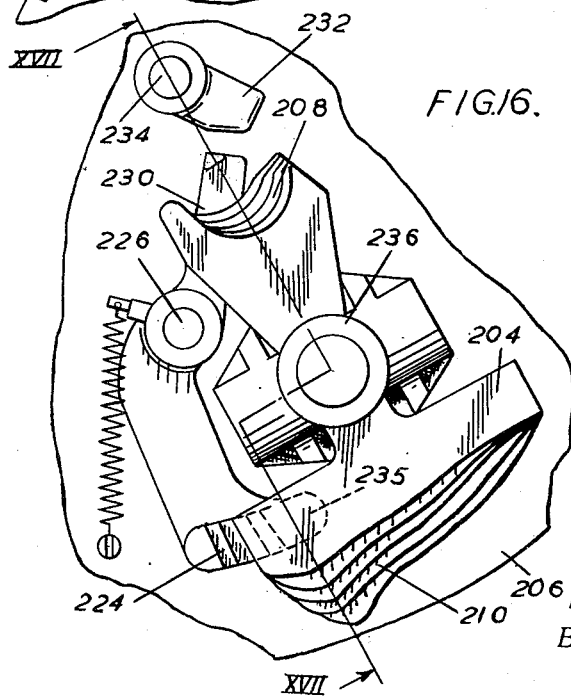
Figure 16 is a plan on a larger scale of one of the control cams.

The machine shown in Figures 15 to 17 is of the same general type as that shown in Figures 1 to 4. It has a drum 174 and a table 176. The drum 174 is larger than the drum 2 and has six openings and clamps for the tails of fish. The sequence of tools is rather different, and the cam members which control the tools are of different construction and adjusted by a different movement.

The first tool is a heading knife 178 corresponding exactly to the knife 18, and controlled by a channel cam 180. The second tool comprises a pair of rotating disc knives 182 corresponding to the knives 26 but slightly differently controlled.

The third tool is a disc knife 184 mounted in a housing 186 which can swing about a fixed axis 188. This knife, as shown in Figure 18, makes a central cut into the fish as far as the backbone 36, that is to say as far as a line parallel to the line 37.

The fourth tool is a ribbed disc 190 corresponding exactly to the disc 38.

The fifth tool is an abrasive disc 192 which is mounted in the same way as the disc 190. This abrasive disc, as shown in Figure 19, scrubs the inner walls of the belly cavity and so removes the skin which lines it and loosens the ribs 193.

Spring-loaded fingers 194 press the belly walls against the abrasive disc.

The sixth tool comprises a pair of rotating spiked wheels 196 mounted close together in a housing 198 which can swing about a fixed axis 200. As shown in Figure 20, the spikes of these wheels pass between the ribs 193 and engage the sides of the backbone 36. As the wheels 196 rotate, the backbone is drawn out of the fish carrying the ribs with it.

The final tool is a rotating disc knife 202 which corresponds to the knife 60. After passing this knife the fish is removed as fillets in the same way as from the machine shown in Figures 1 to 4.

In this machine the tools 190 and 192 follow the line 46 while the tools 184 and 196 follow the line 37 or a line parallel to the line 37. All these tools are controlled by cam members 204 carried on a rotating wheel 206. Each cam member is pivoted on a horizontal axis 207 and has stepped inner and outer surfaces 208 and 210. According to the position into which the member is rocked, different steps corresponding to different ranges of sizes of fish are brought into planes in which they can engage followers 212, 214, 216, 218 and 220. Each cam is normally held in position by the combined action of a spring 222 and a spring-loaded stepped pawl 224 pivoted to the wheel 206 at 226.

As a cam member passes out of engagement with the follower 220, a tail 230 on the corresponding pawl 224 engages a projection 232 on a fixed central pin 234, and the spring 222 urges the cam member anticlockwise as seen in Figure 16 onto the last step 235 of the pawl, to an extreme position corresponding to the smallest fish. Each cam member 204 carries a roller 236 which engages a curved surface 238 on the end of a bell-crank lever 240. This lever has a fixed pivot 242 and is held stationary by the engagement of its other end with a pin 244 on the underside of the rotatable channel cam 180.

The cam 180 is rotated through a clutch controlled by a shoe 245 which rides on the fish in exactly the same way as the cam 70. As the wheel 206 rotates, the cam member 204 is gradually tilted by the engagement of the roller 236 with the surface 238 until the cam 180 begins to turn. Then the bell crank lever 240 is freed, and the cam member 204 remains in the position so far reached, in which those steps on the surfaces 208 and 210 which correspond to the size of the particular fish measured are in the operative position for that fish.

Figures 21 and 22, which correspond to Figures 13 and 14, illustrate the control exercised by the cam members on the tools 190 and 196. It will be seen that the inner surface 208 of each cam member corresponds to the line 37 and the outer surface 210 to the line 46. Not only do the followers 216 and 218 corresponding to the tools 190 and 192 engage the surface 210, but so also does the follower 212. This is linked to the knives 182 and serves to hold them clear of the fish until the vent 62 has passed. The knives then enter the fish and are guided for the rest of their cut by a shoe 246 and a spring 248 in the same way as the knives 26, while the follower 212 disengages from the cam member.

In this machine there is the added advantage that adjustment of the cams is effected not by changing the disposition of a single surface which the followers always engage, but by changing the part of the surface which they engage. In other words, one or another of the steps on each cam surface is brought into the operative position. These steps are not identical in outline but rather are shaped to take account of the slight variations in the backbone and belly lines in accordance with the length of the fish. In consequence the tools carry out the precise movements required to give the best dressing of each size of fish.

What I claim is:

1. In a fish dressing machine, a cam member having controlling surfaces corresponding to the outlines of a fish cut, tool-actuating means operatively engaging said surfaces of the cam member, and feeler means connected with said cam member for setting the position of said cam member relatively to said tool-actuating means depending upon a dimension of the fish being dressed.

2. In a fish-dressing machine, a cam member having two controlling surfaces of different contour corresponding to different outlines of a fish-cut, separate tool-actuating means operatively engaging said controlling surfaces of the cam member, and feeler means connected with said cam member for setting the position of said cam member relatively to said tool-actuating means depending upon a dimension of the fish being dressed.

3. In a fish-dressing machine, a cam member having controlling surfaces corresponding to the outlines of a fish cut, tool-actuating means operatively engaging said surfaces of the cam member, and feeler means connected with said cam member and adapted to engage a fish for setting the position of said cam member relatively to said tool-actuating means depending upon a dimension of said fish.

4. In a fish-dressing machine, a cam member having controlling surfaces corresponding to the outlines of a fish cut, a rotatable support pivotally carrying said cam member, a cam follower engaging said surfaces of the cam member, tool actuating means connected with said cam follower, and feeler means connected with said cam member for setting the position of said cam member relatively to said cam follower depending upon a dimension of the fish being dressed.

5. In a fish dressing machine, a cam member having controlling surfaces corresponding to the outlines of a fish cut, a rotatable support pivotally carrying said cam member, a cam follower engaging said surfaces of the cam member, tool actuating means connected with said cam follower, means connected with said cam member for rocking the same to vary the position of said member relatively to said cam follower, and feeler means connected with said rocking means and adapted to engage a fish for actuating said rocking means depending upon a dimension of said fish.

6. In a fish dressing machine having various tools controlled by cam means, a mechanism for setting the cam means depending on various sizes of fish, said mechanism comprising means moving the cam means from a position corresponding to a fish of a predetermined size to a plurality of other positions corresponding to different fish sizes, means holding the cam means in one of said positions, feeler means adapted to engage a fish and movable depending upon the size of the fish, and means connected with said feeler means and said cam-holding means for actuating the cam-holding means in a predetermined position of said feeler means.

7. In a fish dressing machine having various tools controlled by cam means, a mechanism for setting the cam means depending on various sizes of fish, said mechanism comprising means for moving the cam means from a position corresponding to a fish of the smallest size to a plurality of other positions corresponding to progressively increasing fish sizes, means locking the cam means in one of said positions, a lever, a shoe carried by one end of the lever and adapted to engage a fish to rock the lever depending upon the size of the fish, a bell-crank lever, a pin connected with the first-mentioned lever and tilting the second-mentioned lever when the first-mentioned lever is rocked, a rocking lever, a lug on the third-mentioned lever, a catch carried by the second-mentioned lever and adapted to engage said lug, a spring connected with the third-mentioned lever to swing it when said lug is released by said catch, a bell-crank lever having an end adapted to engage an end of the third-mentioned lever and means connected with the fourth-mentioned lever and the locking member for actuating the locking means when the ends of the third- and fourth-mentioned levers are disengaged.

8. In a fish dressing machine having various tools controlled by cam means, a mechanism for setting the cam means depending on various sizes of fish, said mechanism comprising means moving the cam means from a position corresponding to a fish of the smallest size to a plurality of other positions corresponding to progressively increasing fish sizes, means maintaining the cam means in one of said positions, a shoe adapted to engage a fish and movable depending upon the size of the fish, a clutch operatively controlled by said shoe, and a cam adapted to be rotated by said clutch and connected with the cam maintaining means to actuate them when the cam is rotated.

References Cited in the file of this patent

UNITED STATES PATENTS

| Number | Name | Date |
|---|---|---|
| 1,604,733 | Baader | Oct. 26, 1926 |
| 1,819,060 | Baader | Aug. 18, 1931 |

FOREIGN PATENTS

| Number | Country | Date |
|---|---|---|
| 386,878 | Great Britain | Jan. 26, 1933 |